United States Patent
Kratschmar et al.

(10) Patent No.: US 7,892,689 B2
(45) Date of Patent: Feb. 22, 2011

(54) PRESSURE RELIEF CONTROL SYSTEM FOR A FUEL CELL SYSTEM HAVING A PRESSURIZED FUEL FLOW

(75) Inventors: Kenneth W. Kratschmar, Vancouver (CA); Rasvan C. Mihai, Vancouver (CA); David A. Leboe, Vancouver (CA); Kenneth M. Flaherty, Delta (CA); Adrian J. Corless, New Westminster (CA)

(73) Assignee: Plug Power Inc., Latham, NY (US)

( * ) Notice: Subject to any disclaimer, the term of this patent is extended or adjusted under 35 U.S.C. 154(b) by 736 days.

(21) Appl. No.: 11/823,602

(22) Filed: Jun. 28, 2007

(65) Prior Publication Data

US 2008/0014476 A1    Jan. 17, 2008

Related U.S. Application Data

(60) Provisional application No. 60/806,099, filed on Jun. 28, 2006.

(51) Int. Cl.
*H01M 8/04* (2006.01)

(52) U.S. Cl. .......... 429/443; 429/428; 429/444
(58) Field of Classification Search .......... 429/25, 429/428, 443, 444
See application file for complete search history.

(56) References Cited

U.S. PATENT DOCUMENTS

2006/0024540 A1* 2/2006 LaVen et al. .......... 429/22
2006/0035122 A1* 2/2006 Weissman et al. .......... 429/26

* cited by examiner

*Primary Examiner*—Ula C Ruddock
*Assistant Examiner*—Amanda Barrow
(74) *Attorney, Agent, or Firm*—Trop, Pruner & Hu, P.C.

(57) ABSTRACT

A fuel cell-based system includes an electromechanical pressure relief system to prevent an overpressure condition from damaging the anode circuit of a fuel cell stack or creating a hazardous environment. Upon detection of a fuel flow pressure in a fuel path between a fuel source and the fuel cell stack, the pressure relief system isolates the anode circuit from the fuel path, vents the fuel flow, and shuts down the fuel cell system.

9 Claims, 5 Drawing Sheets

US 7,892,689 B2

PRESSURE RELIEF CONTROL SYSTEM FOR A FUEL CELL SYSTEM HAVING A PRESSURIZED FUEL FLOW

CROSS REFERENCE TO RELATED APPLICATIONS

This application claims the benefit under 35 U.S.C. §119(e) to U.S. Provisional Application Ser. No. 60/806,099, entitled "HYDROGEN SAFETY RELIEF SYSTEM," which was filed on Jun. 28, 2006, and is hereby incorporated by reference in its entirety.

BACKGROUND

The invention generally relates to a pressure relief system for a pressurized gas, and more specifically, to a pressure relief system for hydrogen that is used as a fuel source in a fuel cell system.

A fuel cell is an electrochemical device that converts chemical energy directly into electrical energy. There are many different types of fuel cells, such as a solid oxide fuel cell (SOFC), a molten carbonate fuel cell, a phosphoric acid fuel cell, a methanol fuel cell and a proton exchange membrane (PEM) fuel cell.

As a more specific example, a PEM fuel cell includes a PEM membrane, which permits only protons to pass between an anode and a cathode of the fuel cell. A typical PEM fuel cell may employ polysulfonic-acid-based ionomers and operate in the 50° Celsius (C) to 75° temperature range. Another type of PEM fuel cell may employ a phosphoric-acid-based polybenziamidazole (PBI) membrane that operates in the 150° to 200° temperature range.

At the anode of the PEM fuel cell, diatomic hydrogen (a fuel) ionizes to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

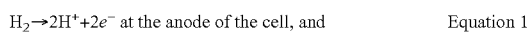

$H_2 \rightarrow 2H^+ + 2e^-$ at the anode of the cell, and    Equation 1

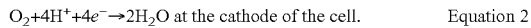

$O_2 + 4H^+ + 4e^- \rightarrow 2H_2O$ at the cathode of the cell.    Equation 2

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Catalyzed electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

The fuel for the fuel cell stack anode is provided by a pressurized flow of hydrogen. As excessive fuel flow pressure can damage the anode and create a hazardous condition within the fuel cell system, care must be taken to ensure that the pressure of the fuel flow that reaches the anode does not exceed a maximum acceptable working pressure for the particular fuel cell configuration.

SUMMARY

In an embodiment of the invention, a fuel cell-based system comprises a system controller having a memory, a fuel cell stack to receive a pressurized fuel flow from a fuel source, and a first control system coupled to the system controller and including executable program code stored in the memory. In response to detection of a fuel flow pressure that exceeds a first predefined threshold, the first control system isolates the fuel cell stack from the fuel flow. The first control system includes executable program code stored in a memory in the system controller. The fuel cell system also includes an electromechanical control system that is independent of the first control system. The electromechanical control system isolates the fuel cell stack from the fuel flow and vents the fuel flow based upon detection of a fuel flow pressure that exceeds a second threshold that is greater than the first threshold.

In another embodiment of the invention, a fuel cell system comprises a fuel cell stack, a fuel path to conduct a pressurized fuel flow from a fuel source to the fuel cell stack, and a pressure relief control system connected to the fuel path and a vent path. In response to detection of the fuel flow pressure in the fuel path exceeding a first threshold, the pressure relief control system isolates the fuel cell stack from the fuel path. In response to detection of the fuel flow pressure exceeding a second threshold, the pressure relief control system releases an amount of fuel in the fuel path through the vent path.

In a yet further embodiment of the invention, a fuel cell system comprises a fuel cell stack, a fuel path to conduct a pressurized fuel flow from a fuel source to the fuel cell stack, and a pressure relief control system connected to the fuel path and a vent path. The pressure relief control system is configured to detect a fuel flow pressure in the fuel path and a presence of fuel in the vent path. When the pressure exceeds a threshold, the control system releases an amount of fuel through the vent path. In response to detection of fuel in the vent path, the control system isolates the fuel cell stack from the fuel path.

Advantages and other features of the invention will become apparent from the following drawing, description and claims.

DETAILED DESCRIPTION

Figure 1:
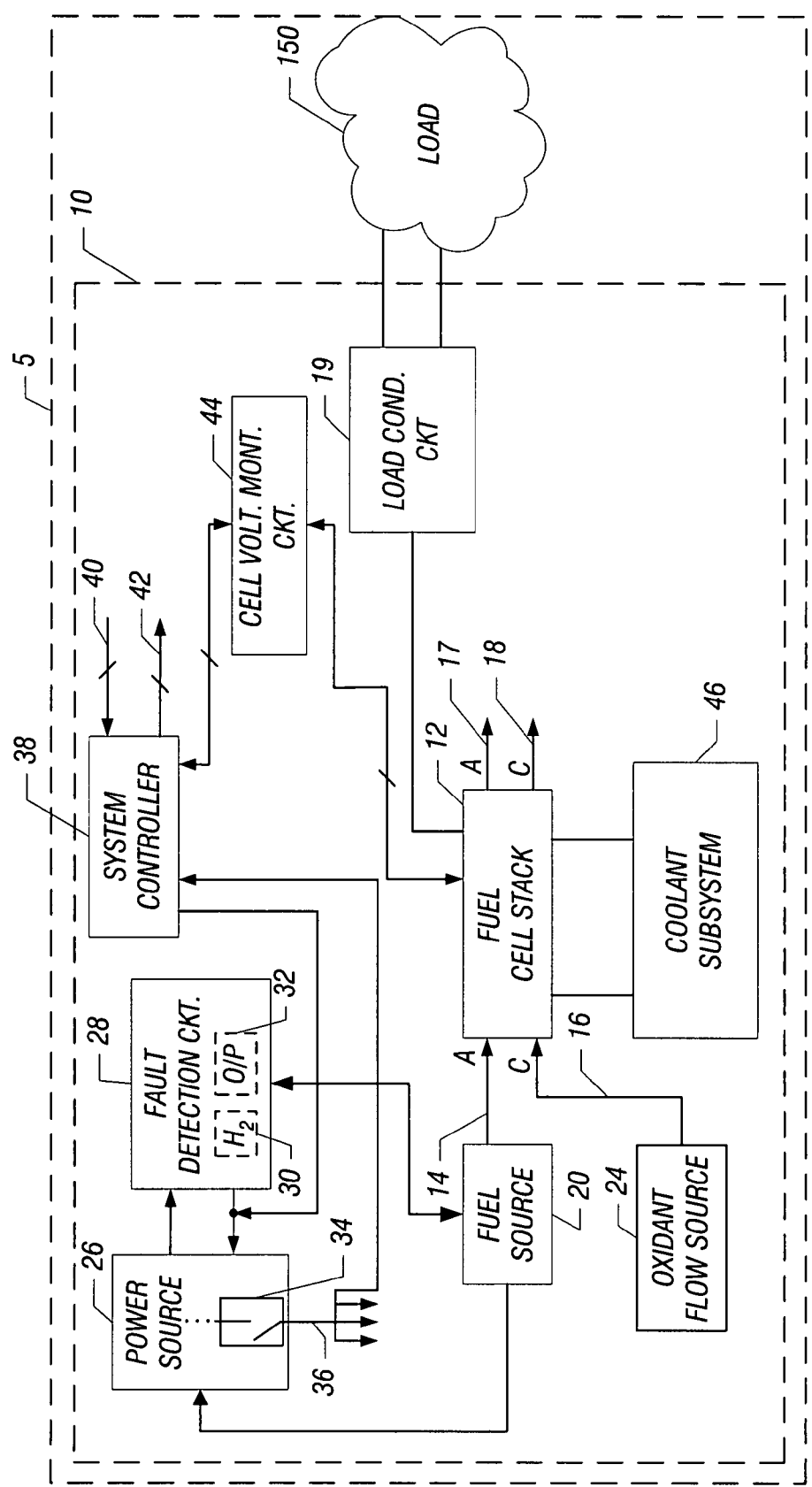
FIG. 1 is a block diagram of a fuel cell-based system according to an embodiment of the invention.

Referring to FIG. 1, an embodiment of a fuel cell-based system 10 includes a fuel cell stack 12, which generates electrical power for an external load 150. In accordance with some embodiments of the invention, the system 10 and load 150 may be portable, or mobile, and more particularly may be (as an example) part of a motor vehicle 5 (a car, truck, airplane, etc.). Thus, the system 10 may serve as at least part of the power plant (represented by the load 150) of the vehicle. In other embodiments of the invention, the system 10 and load 150 may be part of a stationary system. For example, the system 10 may supply all or part of the power needs of a house, electrical substation, backup power system, etc. Additionally, the system 10 may supply thermal energy to a thermal energy consuming load (water heater, water tank, heat exchanger, etc.), and thus, electrical as well as thermal loads to the system are also envisioned. Therefore, many different applications of the system and loads that consume energy from the system are contemplated and are within the scope of the appended claims.

In general, the fuel cell stack 12 receives an incoming fuel flow at its anode inlet 14 from a fuel source 20. The fuel source 20 may be, as examples, a hydrogen tank, a reformer, etc. As will be explained in more detail below, in one embodiment, the fuel source 20 includes a pressurized flow path including various pressure regulator, supply valve, flow control and venting components to provide a high pressure flow of hydrogen to the anode inlet 14 of fuel cell stack 12. The fuel flow is routed through the anode flow channels of the stack 12 to promote electrochemical reactions inside the stack 12 for purposes of generating electrical power. In some embodiments, the fuel flow produces an exhaust at an anode outlet 17 of the fuel cell stack 12 and may be routed to, as examples, a flare or oxidizer depending on the particular embodiment of the invention.

The fuel cell stack 12 also receives an oxidant flow at its cathode inlet 16 from an oxidant source 24, which may be, for example, an air blower or compressor. The oxidant flow is communicated through the cathode flow channels of the stack 12 for purposes of promoting electrochemical reactions inside the stack 12. In accordance with some embodiments of the invention, the cathode exhaust appears at a cathode outlet 18.

The electrical power that is generated by the fuel cell stack 12 is typically in the form of a DC stack voltage, which is received by power conditioning circuitry 19 and transformed into the appropriate AC or DC voltage for the load 150, depending on the particular application. In this regard, the power conditioning circuitry 30 may include, as examples, one or more switching converter stages, an inverter, etc., as can be appreciated by those skilled in the art.

Due to the presence of a fuel (hydrogen, for example) in the fuel cell system 10, the environment in which the system 10 operates may be considered a potentially flammable or hazardous environment. In addition, the fuel is maintained under high pressure, which also can create a hazardous environment and/or damage various components of system 10, such as the fuel cell stack 12 and the inlets of supply valves in the fuel path. Thus, care must be taken to ensure that no hazardous conditions, such as unacceptable concentrations of a flammable fuel or over-pressurization of a particular portion of the system 10, are present either at the startup of system 10 or during operation. To accomplish this, various startup and shutdown protocols may be implemented.

More specifically, in accordance with some embodiments of the invention, upon the startup of the fuel cell system 10, the system 10 controls the communication of electrical power from a power source 26, which, should no unacceptable levels of flammable gas or pressurization be detected, supplies electrical power to the various components of system 10. The power source 26 may be, for example, a battery that is charged during normal operation of the fuel cell system 10 and/or may be a power source (such as a conventional AC source) that is independent of the operation of the fuel cell system 10 altogether. The particular form of the power source 26 is not important to the aspects of the invention that are described herein.

Upon startup of the system 10 from a powered-down state, fault detection circuitry 28 receives power from power supply 26. In accordance with some embodiments of the invention, the fault detection circuitry 28 may include, for instance, a hydrogen detection circuit 30 that responds to detection of hydrogen and an overpressure detection circuit 32 that responds to detection of a high pressure condition within fuel source 20, including anywhere within the fuel path to the stack 12. Detection of hydrogen generally indicates the presence of a potentially flammable environment. Detection of a high pressure condition likewise is indicative of a hazardous environment and/or operating conditions which may result in damage to components of the fuel cell system 10. If a hazard is detected (e.g., flammable gas concentration, overpressure condition, etc.), the fault detection circuitry 28 does not allow power to be communicated from the power source 26 to other components of the system 10. In addition, the fault detection circuitry may also power down the system 10.

If, however, a fault condition is not present at startup, the fault detection circuitry 28 closes a power transfer switch 34 to allow the communication of power from the power source 26 to the power system bus 36, which supplies power to the other components of fuel cell system 10, including a system controller 38.

The system controller 38 generally controls the operations of the fuel cell system 10. In this regard, the system controller 38 includes various input lines 40 and output lines 42 for controlling valves, motors, currents, voltages and sensing various parameters of the fuel cell system 10. Once energized and active, the system controller 38 has the ability to de-energize the entire fuel cell system 10. Likewise, at any time during its operation, should a predetermined fault or hazard level be detected, the fault detection circuit 28 and/or sensor components in the fuel source 20 may also de-energize the entire fuel cell system 10.

Among the other features of the fuel cell system 10, in accordance with some embodiments of the invention, the system 10 may include a cell voltage monitoring circuit 44, which scans the cell voltages of the fuel cell stack 12 to provide statistical information and measured cell voltages to the system controller 38. Additionally, the fuel cell system 10 may include a coolant subsystem 46 to regulate the temperature of stack 12.

It is noted that the fuel cell system 10 is depicted as merely an example of one of many possible implementations of a fuel cell-based system in accordance with embodiments of the invention. Many other variations are contemplated and are within the scope of the invention.

Figure 2:
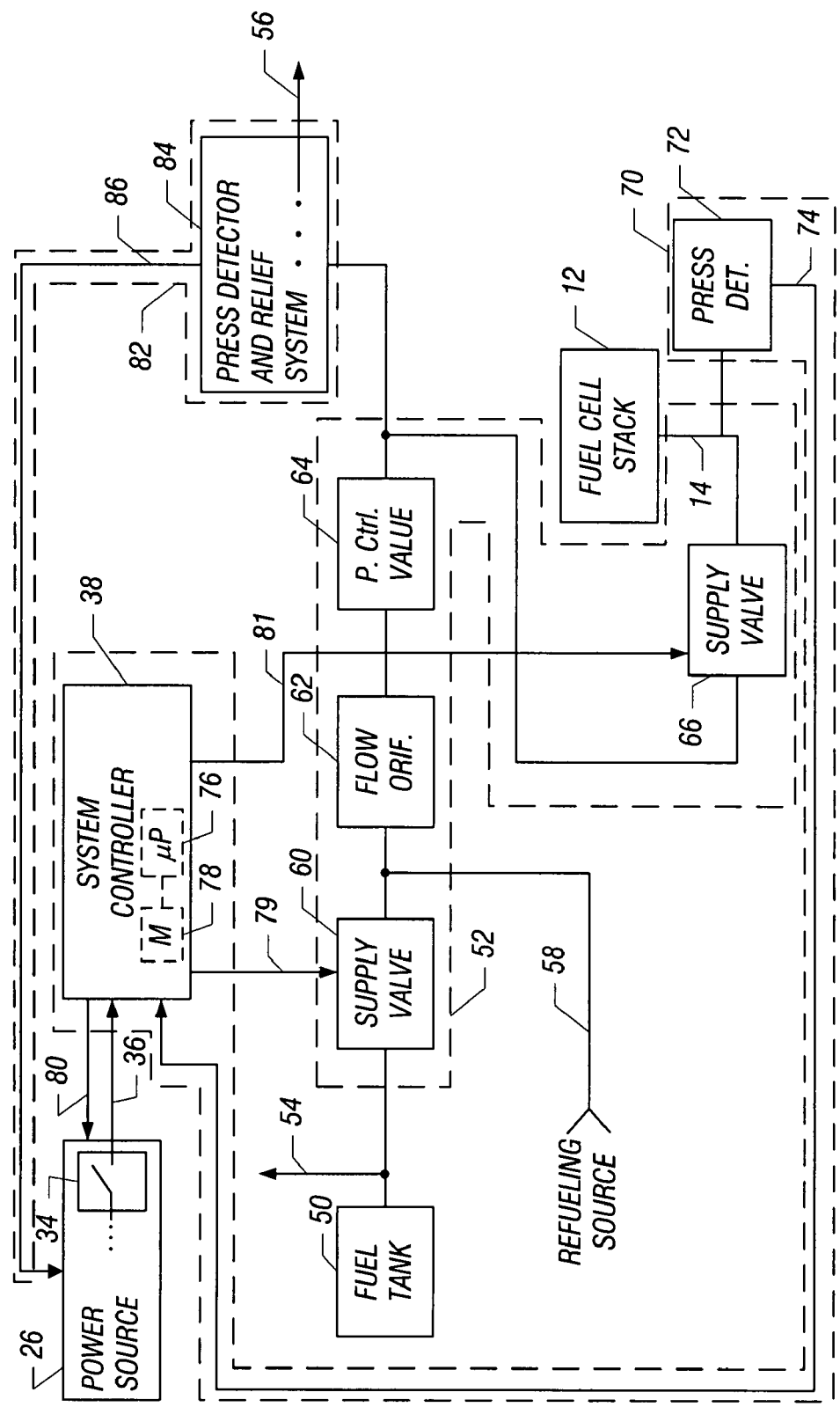
FIG. 2 is a block diagram of an exemplary fuel source of the fuel cell system of FIG. 1.

As a more specific example, FIG. 2 depicts an embodiment of the fuel source 20 according to some embodiments of the invention. In general, the fuel source 20 includes a fuel tank 50 (e.g., a 3600 psi hydrogen tank), a fuel path 52 connecting the fuel tank 50 to the fuel cell stack 12, various vent lines (e.g., lines 54 and 56) to vent a portion of the fuel in the fuel path 52 as needed, and a re-fueling path 58 to provide for re-fueling of the tank 50. The fuel source 20 may also include various sensors or detectors, such as, for instance, fuel detectors, overpressure detectors, temperature sensors, etc., which provide various electrical signals to other components of the system 10 to, for instance, control system 10, provide data to a user of system 10, etc.

As shown in the embodiment depicted in FIG. 2, the fuel path 52 includes a variety of valves connected in series. These valves may include, for instance, a supply valve 60 connected between the tank 50 and a flow orifice 62. The orifice 62 is connected to a pressure control valve 64 which limits the pressure of the fuel flow from the tank 50 to an acceptable level (e.g., approximately 10 psi). Downstream of the pressure control valve 64 is a supply valve 66 which supplies the fuel flow to the anode circuit 14 of the fuel cell stack 12.

The refueling path 58 is connected between the supply valve 60 and the fuel orifice 62. The flow orifice 62 may be particularly useful during the refueling process when a high pressure refueling source is connected to fuel source 20. In one embodiment, the flow orifice 62 may limit a potential flow from a high pressure refueling source during a failure of pressure control valve 64 such that the pressure downstream of the pressure control valve 64 does not exceed, for instance, approximately 80 psi, or other acceptable pressure level depending on the particular configuration of the fuel path 52. The tank 50 may be refueled through the refueling path 58 either while the system 10 is powered down or while the system 10 is powered up and operating.

In addition to the fuel path 52 and the refueling path 58, one or more vent paths are provided. For instance, a vent path 54 is provided to vent a portion of the fuel in the fuel path 52 in the event that the pressure in the fuel path 52 upstream of the supply valve 60 exceeds a predefined threshold. Alternatively, the vent path 54 may be configured such that it vents the fuel upstream of the supply valve 60, such as all of the fuel in the tank 50, in the event that the temperature in the vicinity of the tank 50 exceeds a predetermined threshold (e.g., 120° C.). Similarly, a vent path 56 is provided to vent a portion of the fuel in the fuel path in the event that the pressure in the path 52 downstream of the pressure control valve 64 exceeds a predefined threshold.

In the embodiment illustrated in FIG. 2, the supply valves 60 and 66 are normally closed valves, though other configurations also are contemplated. When the system 20 is powered down, the valves 60 and 66 are closed, thus isolating the fuel tank 50 and the fuel cell stack 12 from the fuel path 52. When the system 10 is powered on and operating, supply valve 60 and supply valve 66 are in an open state and a pressurized fuel flow is provided from the tank 50 to the anode circuit 14 of the fuel cell stack 12. When the system is powered on and the tank 50 is being refueled, a pressurized fuel flow is provided through refueling path 58, the flow orifice 62, the pressure control valve 64, and the supply valve 66.

The fuel source 20 also includes a pressure relief system to prevent the creation of a hazardous environment that may result from an overpressurization event and/or from the accumulation of unacceptable concentrations of hydrogen within the system 10. Overpressurization events may occur as a result of a failure of one or more components of the fuel source 20. For instance, a failure of the pressure control valve 64 may result in an overpressure condition in the portion of the fuel path 52 that is downstream of the control valve 64. As an excessive pressure may result in damage to the fuel cell stack 12, for instance, a pressure relief system may be implemented to detect the pressure in the fuel path 52 and, in response to detection of an overpressure condition, isolate pressure sensitive components of system 10 from the high pressure fuel flow and shutdown the system 10.

In some embodiments of the invention, the fuel pressure relief system may include two independent shutdown and/or pressure relief systems to shutdown system 10 in response to detection of an overpressure condition. The two systems may both be operable in the event of a failure, with the first system shutting down system 10 and the second system relieving a build up of pressure in the fuel path 52. Alternatively, the second pressure relief system may provide a backup relief system that may become operable in the event of a failure of the first system. For instance, in the embodiment shown in FIG. 2, a first system 70 includes a pressure detector 72 which detects a pressure level in the portion of the fuel path 52 between the supply valve 66 and the anode circuit 14 of the fuel cell stack 12. In the event that the pressure detector 72 detects a pressure level that exceeds a predefined threshold (e.g., a level that approaches the Maximum Acceptable Working Pressure ("MAWP") of the system or a component of the system, such as the maximum inlet pressure rating of the fuel cell stack 12), a signal 74 is communicated to the system controller 38, which includes a microcontroller or processor 76 that then executes a software-based protocol (e.g., executable program code stored in a memory 78 in the system controller 38) to shutdown the system 10. For example, execution of the software-based protocol may result in generation of a signal 80 on an output terminal of system controller 38 that causes the switch 34 to open and remove power from the power bus 36 and thus remove power from the system controller 38. Removal of power from the system controller 38 in turn closes one or both of the normally closed supply valves 60 and 66 via signals 79 and 81, thus isolating one or both of the fuel tank 50 and the fuel cell stack 12 from the fuel path 52 and powering down system 10.

The proper operation of software-based system 70 relies on proper operation of both the pressure detector 72 and the proper execution of the software-based protocol stored in memory 78 in the system controller 38. Should either the detector 72 or execution of the software code fail, the potential exists for the creation of a hazardous environment.

Accordingly, in some embodiments of the invention, a second pressure relief system 82 also is implemented. However, it is contemplated that in other embodiments of the invention, the software-based system 70 may be omitted and only the second pressure relief system 82 is implemented. In a preferred embodiment, the second system 82 is a hardware-based system that operates independently of the software-based system 70. More specifically, the hardware-based system 82 is an electromechanical system that detects an overpressure condition and, in response thereto, controls communication of power to the various components of system 10 without the participation of the software stored in memory 78 of the system controller 38. For instance, in the embodiment shown in FIG. 2, the hardware-based pressure relief system 82 includes an overpressure detector and relief system 84 connected downstream of the pressure control valve 64. Once the pressure downstream of the pressure control valve 64 reaches the predefined threshold of the system 84, the system 84 releases a portion of the fuel in the fuel path 52 via the vent 56 and, via an output 86, interrupts communication of power from the power source 26 to other components in system 10, including the system controller 38. The removal of power from the system controller 38 closes valves 60 and 66 and powers down the system 10.

Figure 3:
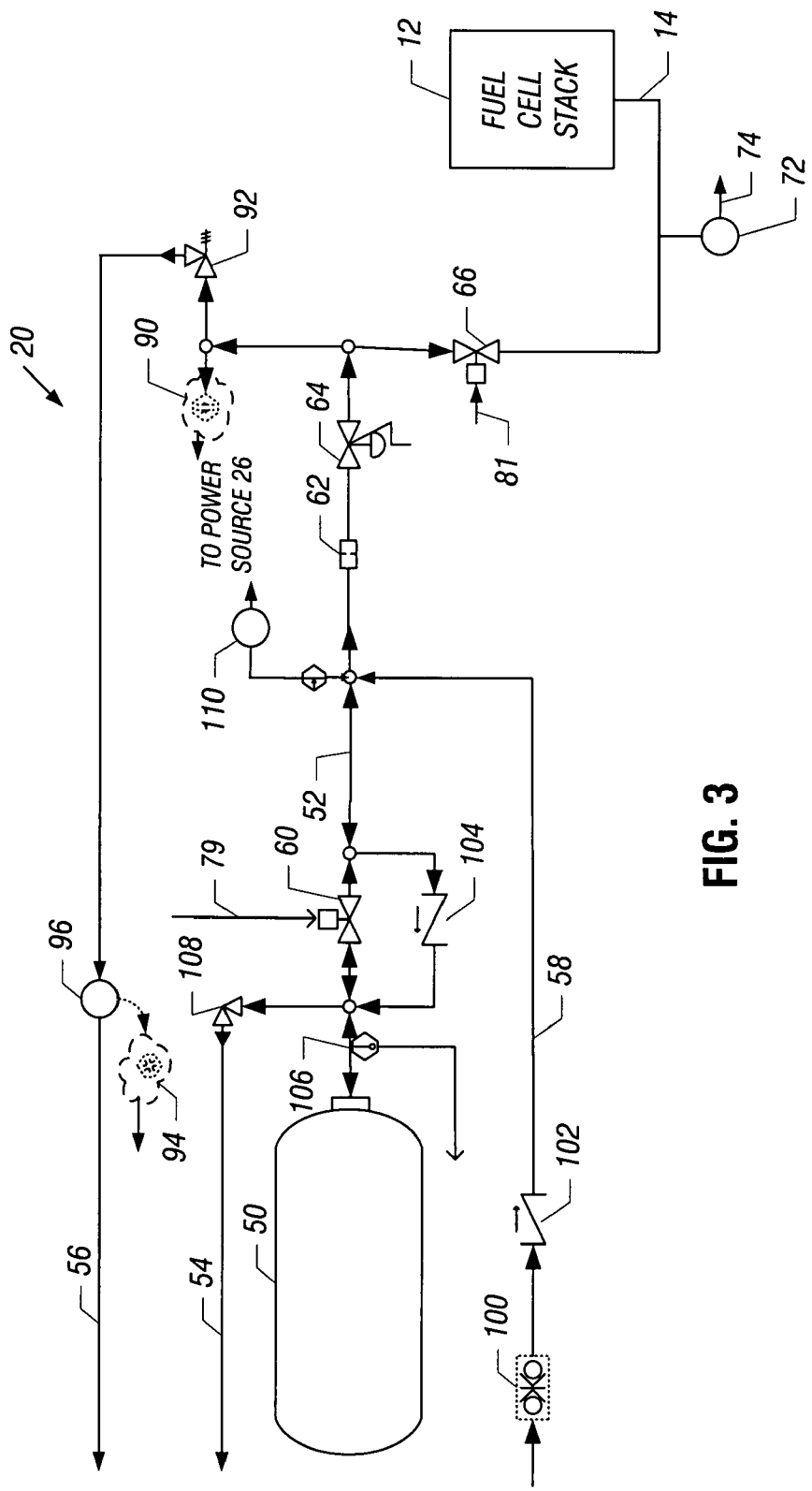
FIG. 3 is a schematic of an exemplary fuel source according to an embodiment of the invention.

Turning now to FIG. 3, an exemplary embodiment of the fuel source 20 is shown. In this embodiment, the pressure detector and relief system 84 includes an overpressure switch 90 and a pressure relief device 92 having a higher predefined pressure set point than the switch 90. In one embodiment the pressure switch 90 is connected directly to the switch 34 of power source 26 such that activation of the switch 90 opens the switch 34 and interrupts the communication of power to the system controller 38 via the power bus 36. More particularly, as the pressure rises downstream of the pressure control valve 64 and once it reaches the pressure set point of the switch 90, the switch 90 is activated (e.g., it opens), and the communication of power from the power supply 26 to the system controller 38 is interrupted and system 10 is shut down. The removal of power from the system controller 38 also results in closure of one or both of the normally closed supply valves 60 and 66, thus isolating the fuel tank 50 and the fuel cell stack 12 from the fuel path 52. Once the supply valves 60 and 66 are closed, the remaining, fixed volume of high pressure gas located between the supply valve 66 and the pressure control valve 64 pressurizes the fuel path between the supply valve 66 and the pressure relief device 92 until the set pressure of the pressure relief device 92 is reached.

In some embodiments, the pressure set point of switch 90 is less than the maximum inlet pressure rating of the supply valve 66, and the set point of the pressure relief device 92 is greater than the set point of the pressure switch 90. Thus, as an example, in an embodiment in which the maximum inlet pressure rating of the supply valve 66 is 50 psi, the pressure threshold for switch 90 may be approximately 17 psi and the pressure set point for pressure relief device 92 may be 35 psi, although other set points that do not exceed the maximum inlet pressure rating of the supply valve 66 also are contemplated. When the device 92 pressure set point is reached, the pressure relief device 92 opens and relieves the fixed volume of gas via the vent line 56 until the pressure reset point of pressure relief device 92 is reached. The pressure relief device 92 then closes.

In some embodiments of the invention, the pressure reset point of pressure relief device 92 is greater than the pressure threshold of pressure switch 90. For instance, the pressure reset point may be 30 psi in an embodiment in which the pressure threshold of switch 90 is approximately 17 psi. Accordingly, even after device 92 has completed venting a portion of the fuel via the vent 56, the pressure switch 92 will remain in its activated state (e.g., open) and prevent the communication of power to the system controller 38 and other components of system 10. Thus, system 10 cannot be restarted until the initial cause of the overpressurization event is diagnosed and repaired.

In some embodiments, system 10 also may include a hydrogen sensor 94 and a bypass vent 96. In one embodiment, the bypass vent 96 is located in the vent line 56 in close proximity to the hydrogen sensor 94. Accordingly, whenever the pressure relief device 92 is open and relieving pressure from the fuel path 52, a small amount of hydrogen gas will be released through the bypass vent 96 in sufficient amount to be detected by the hydrogen sensor 94. The hydrogen sensor 94 may be coupled to fault detection circuitry, such as circuitry 28, such that if unacceptable hydrogen concentration levels are detected, a signal may be generated which shuts down the system 10, such as, for instance, by removing the power provided to the system controller 38 by providing a signal to the power source 26 that opens switch 34. Thus, in the event of a failure of the pressure relief device 92 in a manner in which it is continually releasing fuel through the vent line 56, the bypass vent 96 and hydrogen sensor 94 may serve to shutdown the system 10, potentially avoiding the creation of a hazardous environment.

In the exemplary embodiment illustrated in FIG. 3, the refueling path 58 includes a quick disconnect connection 100, a check valve 102 and a check valve 104. When the tank 50 is being refueled while the system 10 is powered down, the fuel flows from the refueling source and into the tank 50 through the connection 100, the valve 102 and the valve 104. When the tank is being refueled while the system 10 is powered on and operating, the fuel flows from the refueling source and into the tank 50 through the connection 100, the valve 102 and the supply valve 60. A temperature sensor 106 is provided to provide temperature indications during refueling to ensure that the tank 50 receives a sufficient amount of fuel. In addition, a pressure relief device 108 is connected upstream of the supply valve 60 to vent the fuel from the tank 50 in the event that the temperature in the vicinity of the tank 50 exceeds a predetermined threshold (e.g., 120° C.). A pressure detector 110 also is provided downstream of the supply valve 60 to provide indications of an overpressure condition in this section of the fuel path 52. Depending on the particular configuration of the fuel source 20, other valves, sensors and features may be incorporated as may be appropriate.

Figure 4:
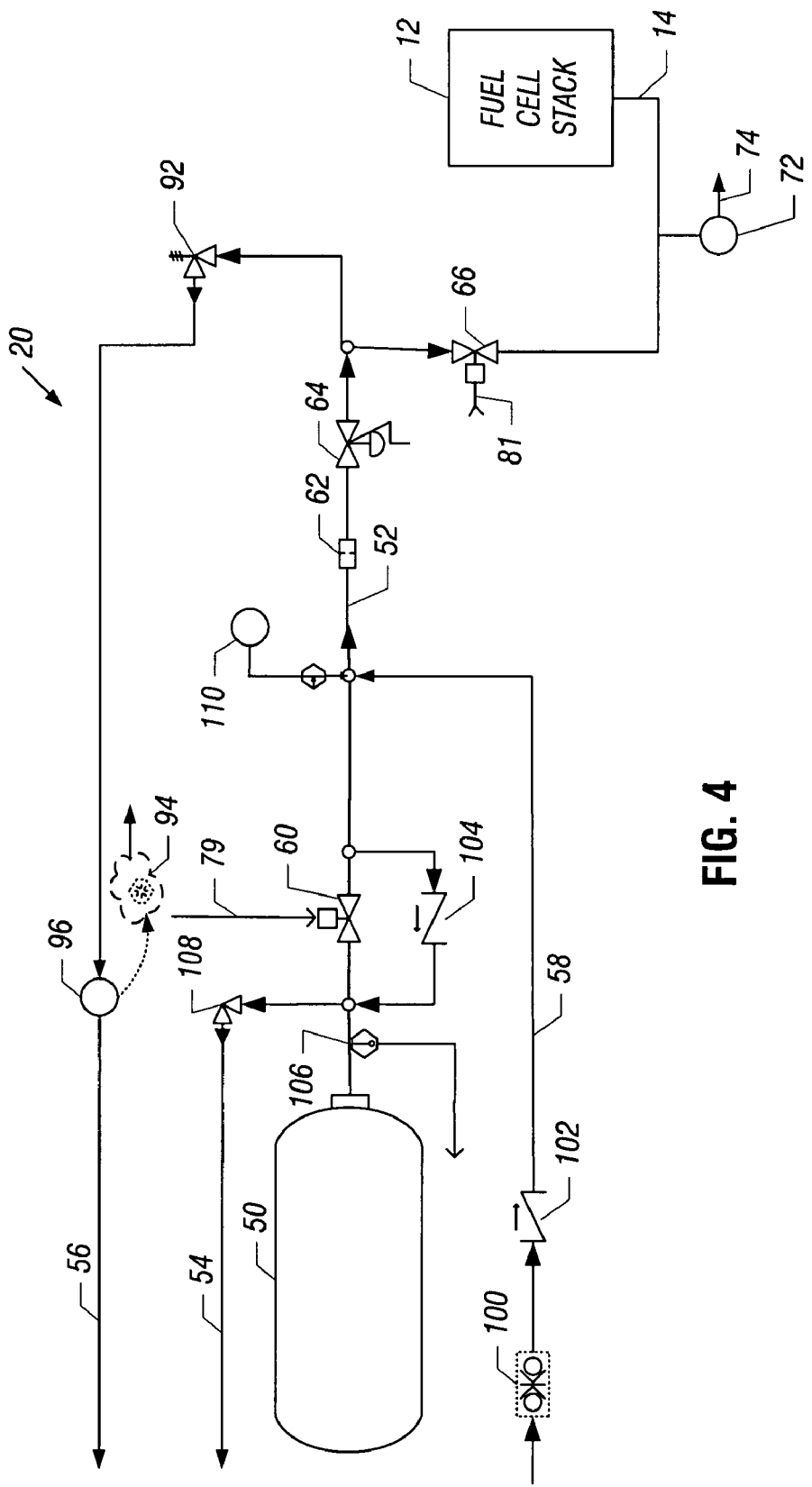
FIG. 4 is a schematic of another exemplary fuel source according to an embodiment of the invention.

Another exemplary embodiment of a second pressure relief system 82 in accordance with the invention is shown in FIG. 4. In this embodiment, the pressure detector and relief system 84 includes the pressure relief device 92, the bypass vent 96 and the hydrogen sensor 94. Should an overpressurization event occur (e.g., due to a failure of the pressure control valve 64 or the software-based shutdown system 70 or any other event which results in overpressurization of the fuel path downstream of the pressure control valve 64), the pressure relief device 92 will open when the pressure reaches its set point and relieve the pressure in the fuel path 52. When the pressure drops to the reset point of the pressure relief device 92, the device 92 closes. In one embodiment, the pressure set point of the pressure relief device 92 is less than or approximately the same as the maximum inlet pressure rating of the supply valve 66. For instance for an inlet rating of 50 psi, the set point of the pressure relief device 92 may be 22 psi, or other value that does not exceed 50 psi.

In this embodiment shown in FIG. 4, communication of power to the system 10 is controlled by the bypass vent 96 and the hydrogen sensor 94. Thus, whenever the pressure relief device is open and relieving pressure, a portion of the released gas will pass through the bypass vent 96 in an amount sufficient to be detected by the hydrogen sensor 94. As explained above, in response to detection of an unacceptable concentration of hydrogen by the hydrogen sensor 94, communication of power to the system 10 and, in particular, the system controller 38, is interrupted. The interruption of power in turn closes the normally closed supply valves 60 and 66 to isolate the fuel tank 50 and the fuel cell stack 12 from the fuel path 52. In this embodiment, in the event the system 10 is re-started and the failure condition (e.g., a failure of pressure control valve 64, a failure of pressure relief device 92, etc.) has not been repaired, fuel again will be released through the vent line 56 and be detected by the hydrogen sensor 94 via the bypass vent 96, thus again shutting down the system 10.

Figure 5:
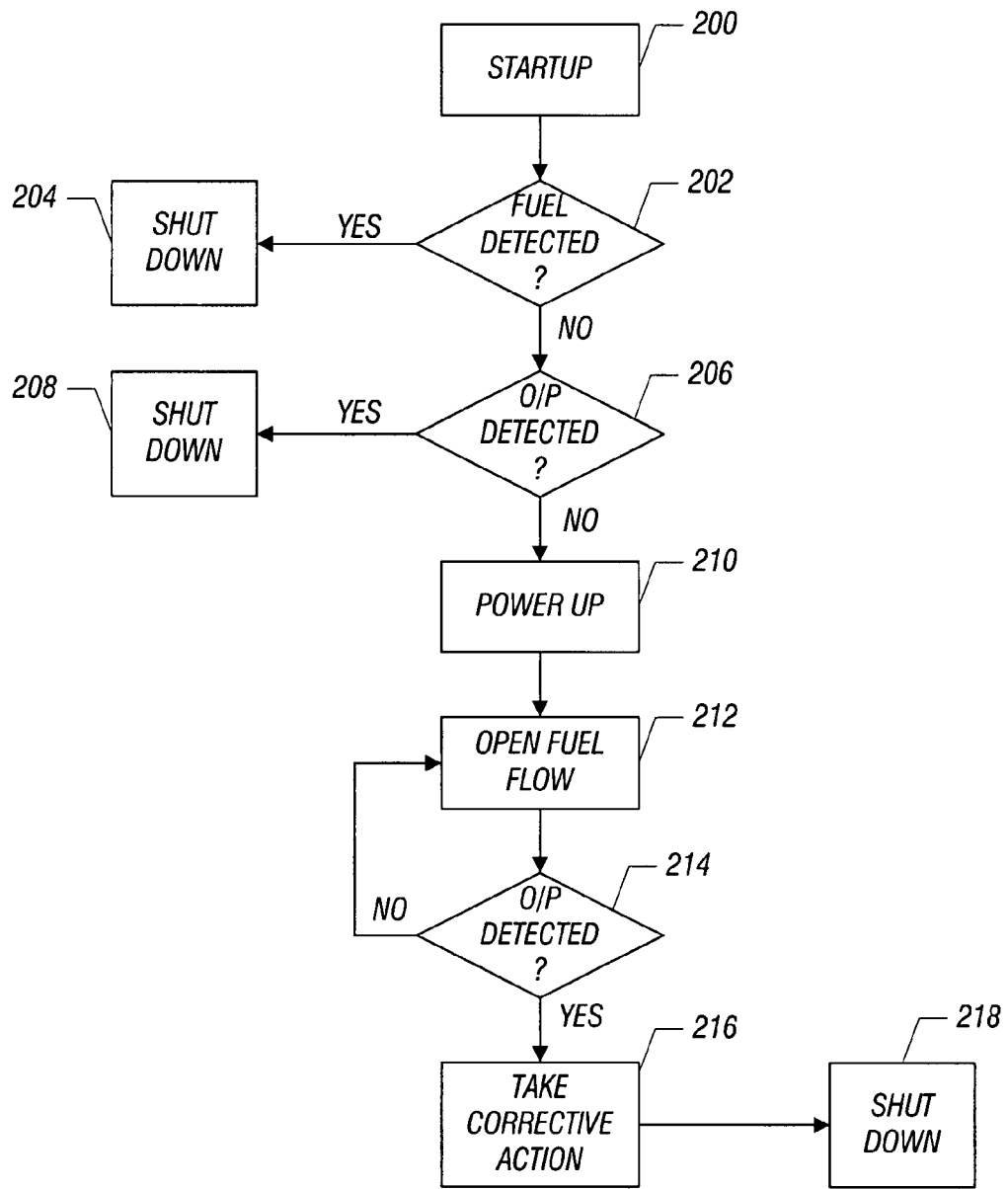
FIG. 5 is a flow chart depicting an exemplary method that may be implemented by the fuel cell system of FIG. 1.

FIG. 5 provides a flow chart of an exemplary pressure detection, relief and shutdown method that may be implemented by the fuel cell system 10. When startup power is applied to the system 10 (block 200), fault detection circuitry (e.g., circuitry in fuel source 20, circuitry 28, etc.) determines whether a concentration of a fuel (e.g., hydrogen) has been detected (diamond 202). If so, then the system 10 is shutdown (block 204). If not, then the fault detection circuitry may determine whether an overpressure condition currently is present (diamond 206). If so, then the system 10 is shutdown (block 208). If not, then power is applied to the various components of system 10 (block 210) and the fuel flow from the fuel source to the fuel cell stack 12 is initiated (block 212). The system 10 continues to monitor for the presence of an overpressure condition (diamond 214). As long as such a condition is not present, the fuel flow is continued. However, if an overpressure condition is detected, then corrective action is taken (block 216) which may include, for example, any one or more of isolating the fuel cell stack 12 and/or the fuel source 50 from the fuel path 52, venting a portion of the fuel in the fuel path 52, detecting a portion of the vented fuel, etc. The system 10 then is shutdown (block 218).

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A fuel cell-based system comprising:
   a fuel cell stack;
   a fuel path to conduct a pressurized fuel flow from a fuel source to the fuel cell stack;
   a system controller to control the fuel cell system; and
   a pressure relief control system connected to the fuel path and a vent path, wherein in response to detection of the fuel flow pressure in the fuel path exceeding a first threshold, the pressure relief control system interrupts communication of power to the system controller and isolates the fuel cell stack from the fuel path, and wherein in response to detection of the fuel flow pressure in the fuel path exceeding a second predefined threshold, the pressure relief control system releases a portion of fuel in the fuel path through the vent path,
   wherein the pressure relief control system includes a pressure switch to interrupt the communication of power to the system controller, and wherein the pressure switch is activated by application of a fuel flow pressure to the pressure switch that exceeds the first threshold and wherein the pressure relief control system is further configured to isolate the fuel cell stack from the fuel path in response to detection of an amount of fuel in the vent path that exceeds a threshold amount.

2. The system as recited in claim 1, wherein the second predefined threshold is greater than the first predefined threshold.

3. The system as recited in claim 1, wherein the pressure relief control system includes a pressure relief device to release the portion of fuel through the vent path.

4. The system as recited in claim 3, wherein the pressure relief control system is configured to prevent startup of the fuel cell system after the pressure relief device has released the portion of fuel through the vent path.

5. A fuel cell-based system comprising:
   a fuel cell stack;
   a fuel path to conduct a pressurized fuel flow from a fuel source to the fuel cell stack; and
   a pressure relief control system connected to the fuel path and a vent path, wherein in response to detection of the fuel flow pressure in the fuel path exceeding a first threshold, the pressure relief control system isolates the fuel cell stack from the fuel path, and wherein in response to detection of the fuel flow pressure in the fuel path exceeding a second predefined threshold, the pressure relief control system releases a portion of fuel in the fuel path through the vent path, and wherein in response to detection of an amount of fuel in the vent path exceeding a threshold amount, the pressure relief control system isolates the fuel cell stack from the fuel path.

6. The system as recited in claim 5, wherein the second predefined threshold is greater than the first predefined threshold.

7. The system as recited in claim 5, comprising a system controller to control the fuel cell system, wherein the pressure relief control system interrupts communication of power to the system controller in response to detection of the fuel flow pressure in the fuel path exceeding the first threshold.

8. The system as recited in claim 7, wherein the pressure relief control system includes a pressure switch to interrupt the communication of power to the system controller and a pressure relief device to release the amount of fuel through the vent path, wherein the pressure switch is activated by application of a fuel flow pressure to the pressure switch that exceeds the first threshold.

9. The system as recited in claim 8, wherein the pressure switch and the pressure relief device are configured to prevent startup of the fuel cell system after the pressure relief device has released the portion of fuel through the vent path.

* * * * *